(12) United States Patent
Furumatsu

(10) Patent No.: US 7,185,022 B2
(45) Date of Patent: Feb. 27, 2007

(54) WORK DATA MANAGEMENT SYSTEM AND WORK DATA MANAGEMENT METHOD

(75) Inventor: Daisuke Furumatsu, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 289 days.

(21) Appl. No.: 10/055,424

(22) Filed: Jan. 23, 2002

(65) Prior Publication Data

US 2002/0103665 A1  Aug. 1, 2002

(30) Foreign Application Priority Data

Jan. 26, 2001  (JP)  ............................. 2001-019307

(51) Int. Cl.
*G06F 17/30*  (2006.01)
(52) U.S. Cl. .................. 707/104.1; 707/9; 707/10; 707/102
(58) Field of Classification Search ................ 719/329; 705/8, 32, 400, 1, 9; 707/10, 104.1, 103 R, 707/9, 102; 702/178; 600/300; 709/229, 709/216, 217, 218; 438/15
See application file for complete search history.

(56) References Cited

U.S. PATENT DOCUMENTS

| | | | | |
|---|---|---|---|---|
| 4,347,568 A | * | 8/1982 | Giguere et al. ............. | 600/300 |
| 4,819,162 A | * | 4/1989 | Webb et al. .................. | 705/32 |
| 4,847,791 A | * | 7/1989 | Martin et al. ............... | 702/178 |
| 5,600,554 A | * | 2/1997 | Williams ...................... | 705/1 |
| 5,717,867 A | * | 2/1998 | Wynn et al. .................. | 705/32 |
| 5,765,140 A | * | 6/1998 | Knudson et al. ............... | 705/9 |
| 5,771,172 A | | 6/1998 | Yamamoto et al. ......... | 364/468 |
| 5,910,010 A | * | 6/1999 | Nishizawa et al. ........... | 437/15 |
| 5,991,742 A | * | 11/1999 | Tran ............................ | 705/32 |
| 6,006,195 A | * | 12/1999 | Marchak et al. ............... | 705/9 |
| 6,049,776 A | * | 4/2000 | Donnelly et al. .............. | 705/8 |
| 6,073,109 A | * | 6/2000 | Flores et al. .................. | 705/8 |
| 6,076,110 A | * | 6/2000 | Murphy et al. ............. | 709/228 |
| 6,138,104 A | * | 10/2000 | Marchak et al. ............... | 705/9 |
| 6,263,322 B1 | * | 7/2001 | Kirkevold et al. .......... | 705/400 |
| 6,338,097 B1 | * | 1/2002 | Krenzke et al. ............ | 719/329 |

(Continued)

FOREIGN PATENT DOCUMENTS

JP  5-274508  10/1993

(Continued)

OTHER PUBLICATIONS

English abstract re Japanese Patent Application Laid-Open No. JP 5-274508.

(Continued)

*Primary Examiner*—Frantz Coby
(74) *Attorney, Agent, or Firm*—Cook, Alex, McFarron, Manzo, Cummings & Mehler, Ltd.

(57) ABSTRACT

A work data management system is provided with terminals through which to input work data, a database, and a server. The terminals, the database, and the server are connected to a network. The server is provided with a Web server and a Web application. The database is divided into a plurality of masters. The Web application checks whether data that has been input through one of the terminals agrees with corresponding data stored in the database, and stores the input data in the database if it is acknowledged.

20 Claims, 8 Drawing Sheets

U.S. PATENT DOCUMENTS

| | | | |
|---|---|---|---|
| 6,347,306 B1* | 2/2002 | Swart | 705/32 |
| 6,408,337 B1* | 6/2002 | Dietz et al. | 709/229 |
| 6,704,117 B1* | 3/2004 | Chintakrindi et al. | 358/1.15 |
| 6,732,079 B1* | 5/2004 | Kintner et al. | 705/8 |
| 6,741,993 B1* | 5/2004 | Zitaner et al. | 707/10 |
| 6,856,999 B2* | 2/2005 | Flanagin et al. | 707/103 Y |
| 6,954,737 B2* | 10/2005 | Kalantar et al. | 705/50 |
| 2001/0034623 A1* | 10/2001 | Chung | 705/5 |
| 2001/0042032 A1* | 11/2001 | Crawshaw et al. | 705/32 |
| 2003/0088534 A1* | 5/2003 | Kalantar et al. | 706/50 |
| 2004/0177090 A1* | 9/2004 | Corbett-Clark | 707/103 Z |
| 2004/0236619 A1* | 11/2004 | Gundersen et al. | 705/8 |
| 2004/0260950 A1* | 12/2004 | Ougi et al. | 713/201 |

FOREIGN PATENT DOCUMENTS

| | | |
|---|---|---|
| JP | 8-016950 | 2/1996 |
| JP | 2756483 | 3/1998 |
| JP | 10-232893 | 9/1998 |
| JP | 11-224356 | 8/1999 |
| JP | 23000-011041 | 1/2000 |

OTHER PUBLICATIONS

English abstract re Japanese Patent Notification No. JP 8-016950.
English abstract re Japanese Patent No. JP 2756483.
English abstract re Japanese Patent Application Laid-Open No. JP 10-232893.
English abstract re Japanese Patent Application Laid-Open No. JP 11-224356.
English abstract re Japanese Patent Application Laid-Open No. JP 2000-011041.

* cited by examiner

FIG.3

SEL WORK CARD SYSTEM

PLEASE LOG ON BY INPUTTING A USER ID AND A PASSWORD.

| USER ID: | |
|---|---|
| PASSWORD: | |
| LOG ON | PASSWORD CHANGE |

VER. 1.0 COPYRIGHT(O), SEMICONDUCTOR ENERGY LABORATORY CO. LTD. 2000

FIG.4

SELECTION OF MONTH
OF DATA INPUT

| SEL WORK CARD | | |
|---|---|---|
| 2000 YEAR    THIS MONTH IS DECEMBER. | | |
| ○ JAN. | ○ FEB. | ○ MAR. |
| ○ APR. | ○ MAY. | ○ JUN. |
| ○ JUL. | ○ AUG. | ⊙ SEPT. |
| ○ OCT. | ○ NOV. | ○ DEC. |

| WORK CARD DISPLAY | SELF CONFIRMATION SEAL |
|---|---|

| CONFIRMATION OF SUBSTITUTE ATTENDANCE |
|---|

FIG.5

| | DATA INPUT | | | |
|---|---|---|---|---|
| WORK DATA INPUT | | | | |
| YEAR/MONTH/DAY | 2001 YEAR  01 MONTH  26 DATE (FRIDAY) | | | |
| WORK FORM | ⦿REGULAR  ○ SHIFT  ○SUBSTITUTE  ○HOLIDAY | | | |
| WORKING HOURS | START TIME | END TIME | TOTAL REST TIME | |
| | 17:45 ~ | 20.00 | 00:15 ▼ | |
| | [CALCULATION OF REGULAR TIME] | [ ] EXCEPT FOR REST TIME | | |
| MIDNIGHT REST | START TIME | END TIME | | |
| | ☐ ~ ☐ | | | |
| SCHEDULE OF SUBSTITUTE HOLIDAY | ☐ | UNUSED SUBSTITUTE HOLIDAY | SELECTION ▼ | |
| | [REGISTRATION MODIFICATION] [INPUT CLEARANCE] [DATA DELETION] | | | |

APPLICATION ITEM INPUT

[ABSENCE] [PAID HOLIDAY] [SUBSTITUTE HOLIDAY] [TEMPORARY LEAVE] [LEAVE OF ABSENCE FROM DUTY] [NURSING/ CHILD-CARE LEAVE]

[SPECIAL HOLIDAY] [REASON FOR SPECIAL HOLIDAY SELECTION ▼] [NUMBER OF DAYS CONFIRMATION SELECTION ▼]

| SUBSTITUTE HOLIDAY | | START TIME | END TIME |
|---|---|---|---|
| ☐ | ☐ | ☐ ~ | ☐ |
| UNUSED SUBSTITUTE HOLIDAY | ☐ | ☐ ~ | ☐ |
| SELECTION ▼ | ☐ | ☐ ~ | ☐ |

| REASON FOR APPLICATION | ☐ |
|---|---|
| | ☐ |
| | ☐ |

[REGISTRATION MODIFICATION] [INPUT CLEARANCE] [DATA DELETION]

FIG. 6
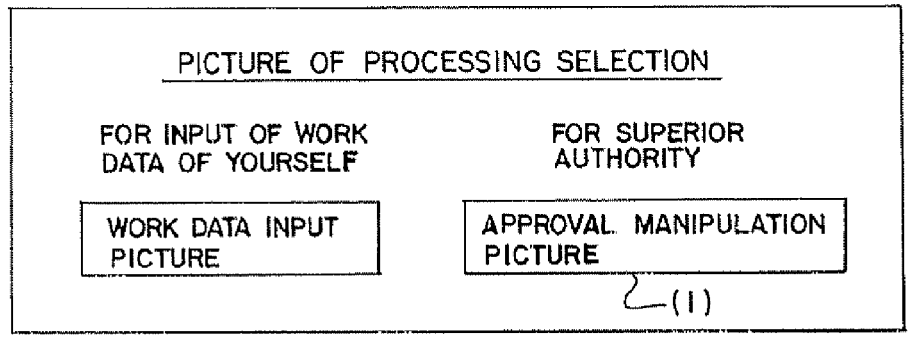
FIG. 7A
FIG. 7B
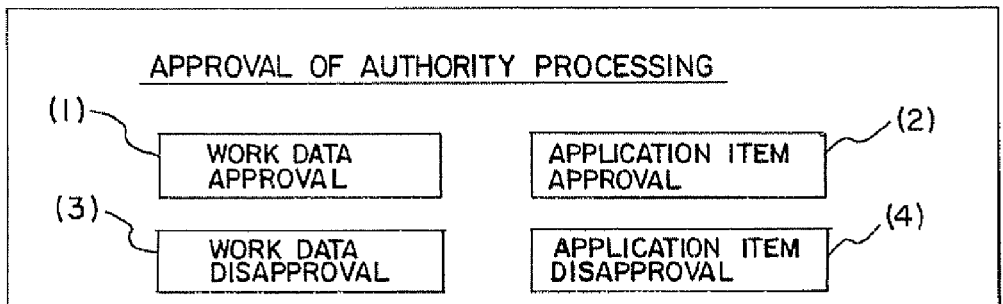

FIG.8

GENERAL AFFAIRS DEP. PROCESSING

UNIT:  GROUP:

[ SELECTION ▼ ]   [ SELECTION ▼ ]

[ WORK DATA APPROVAL PROCESSING ]

FIG.9

WORK DATA CHECK

UNIT:

[          ] YEAR  [   ] MONTH

EMPLOYEE NO. [          ]   EMPLOYEE NAME [          ▼]

[ WORK DATA LIST REFERENCE ] (2)

(1) [ GENERAL AFFAIRS DEP. APPROVAL PROCESSING ]   [ LOCKING CANCELATION ]   [ FINAL LOCKING ] (3)

[ SUBSTITUTE ATTENDANCE REFERENCE ]   [ SUBSTITUTE HOLIDAY REFERENCE ]

FIG. 11

WORK CARD OF JANUARY 2001

EMPLOYEE NO.: 0000
UNIT NAME: SALES DEP.
EMPLOYEE NAME: HANDOUTAI TARO

| DATE | HOLIDAY | WORK | | | | | | |
|---|---|---|---|---|---|---|---|---|
| | | START TIME | END TIME | REST | REST AT MIDNIGHT | SHIFT | SUBSTITUTE HOLIDAY | OVERTIME WORK |
| 01 | | 17:45 | 19:00 | 00:15 | | | | |
| 02 | HOL. | | | | | | | |
| 03 | HOL. | | | | | | | |
| 04 | | | | | | | | |
| 05 | | | | | | | | |
| 06 | | 17:45 | 21:00 | 00:15 | | | | |
| 07 | | | | | | | | |
| 08 | | | | | | | | |
| 09 | HOL. | 09:00 | 15:00 | 00:45 | | | | |
| 10 | HOL. | | | | | | | |

(1)

WORK DATA MANAGEMENT SYSTEM AND WORK DATA MANAGEMENT METHOD

BACKGROUND OF THE INVENTION

1. Field of the Invention

The present invention relates to a system and a method for managing work data of employees using data (e.g., a group to which each employee belongs, content of work, working hours, and paid holidays and substitute holidays) of all employees that are registered in a database.

2. Description of the Related Art

Among conventional methods for managing work data (e.g., working hours, a work form, application items such as late coming, early leaving, and a paid holiday) of employees are a method in which individual employees write their own work data on distributed work data input sheets and an employee dedicated to office work acknowledges their appropriateness and manages those, a method in which work data that are input through a time clock by individual employees are collected online and managed by a host computer, and a method disclosed in Japanese Patent Application Laid-Open No. 5-274508 in which work data are input in such a manner that pieces of personal information are converted into bar codes in advance and the input data and their appropriateness are checked by using a database in which office regulations are stored.

However, with the above management methods, when the number of employees increases or decreases or when it becomes necessary to employ a variety of work forms, the recognition and management of work data of employees are complicated and the check of their appropriateness takes time. Where work data are managed by means of documents, the documents need to be stored to protect the data. This results in, for example, a problem that resources and document storage area needed increase as the number of employees increases. Work data themselves need to be managed correctly because they are also used for calculation of salaries and bonuses.

Even where work data are managed by computers (e.g., personal computers), if a work data management system is installed in each computer as software, updating of the version of the management system requires installation of new work data management system software in all terminals for input of work data. If the number of terminal becomes large as a result of increase of the number of employees, installing a new system in all terminals takes much time and labor.

Further, there may occur a case that places of work are distributed in the whole country rather than only one place of work exists. Where work data cannot be managed in a unified manner as in this case, it is necessary to gather, at each branch office, work data of employees working there and then acknowledge, check, add up, and store the work data at the head office. This takes time and labor.

SUMMARY OF THE INVENTION

An object of the present invention is to solve the above problems, that is, to provide a system capable of unified management of work data of employees in a correct and easy way.

The invention provides a work data management system comprising terminals through which to input work data; a database comprising at least one of an employee data master, a substitute attendance master, a unit/group master, a job master, a work data list master, a work management section master, a paid holiday master, and a company holiday master; and a server comprising a Web server and a Web application, wherein the terminals, the database, and the server are connected to a network; and wherein the Web application checks whether data that has been input through one of the terminals agrees with corresponding data stored in the database, and stores the input data in the database if it is acknowledged.

The above work data management system may be such that in each of the terminals an employee can input work data through any personal computer having a Web browser.

The network may be one of a LAN (local area network) and a WAN (wide area network).

The work data management system may be such that an employee can input or refer to work data or application item data through any of the terminals as long as it is connected to the network.

The invention also provides a work data management method comprising a first step of an employee's inputting a user ID and a password through a terminal that is connected to a network: a second step of identifying the employee based on data stored in a database using the user ID and the password, and checking manipulable processing contents of the employee: a third step of displaying, on the terminal, a picture that urges the employee to input work data; a fourth step of checking appropriateness of input work data, and storing the input work data in a work data list master if the input work data is judged appropriate: a fifth step of storing, in a work data list master, work data for which an approval authority processing manipulation has completed.

The invention further provides a work data management method comprising a first step of an employee's inputting a user ID and a password through a terminal that is connected to a network; a second step of identifying the employee based on data stored in a database using the user ID and the password, and checking manipulable processing contents of the employee: a third step of displaying, on the terminal, a picture that urges the employee to input daily work data; a fourth step of checking appropriateness of input work data, and storing the input work data in a work data list master if the input work data is judged appropriate: a fifth step of storing, in a work data list master, work data for which an approval authority processing manipulation has completed; a sixth step of storing, in a work management section master, work data for which an end-of-month processing manipulation has completed; a seventh step of storing, in the work management section master, data for which an end-of-month approval authority processing manipulation has completed; an eighth step of storing, in the work management section master, data for which a general affairs department end-of-month approval authority processing manipulation has completed; and a ninth step of storing, in the work management section master, data for which final protection processing manipulation has completed.

The work data management method may further comprise a step of displaying a picture dedicated to approval authority on the terminal if at the second step the employee is judged eligible to perform an approval authority manipulation as well as to input work data.

The work data management method may further comprise a step of displaying a picture dedicated to general affairs department authority on the terminal if at the second step the employee is judged eligible to perform an approval authority manipulation and a final protection manipulation.

The present invention is further characterized in that the employee can manage the work data not affected by manipulable processing contents through any terminal as long as it has a Web browser and is connected to any network.

In this specification, the term "Web application" means an application for receiving, through the Web server, data that have been input through a Web server and constructing necessary data by storing those in the database or a file, and for returning the constructed data to the Web browser via the Web server.

BRIEF DESCRIPTION OF THE DRAWINGS

FIG. 3 shows a picture for data input;
FIG. 4 shows a picture for data input;
FIG. 5 shows a picture for data input;
FIG. 6 shows a picture for data input;
FIGS. 7A and 7B show pictures for data input;
FIG. 8 shows a picture for data input;
FIG. 9 shows a picture for data input;
FIG. 11 shows a picture for data input.

DESCRIPTION OF THE PREFERRED EMBODIMENTS

Embodiment 1

In this embodiment, management of a work data management system according to the invention will be described for an example of an employee who has performed regular work and overtime work of two hours.

Figure 1:
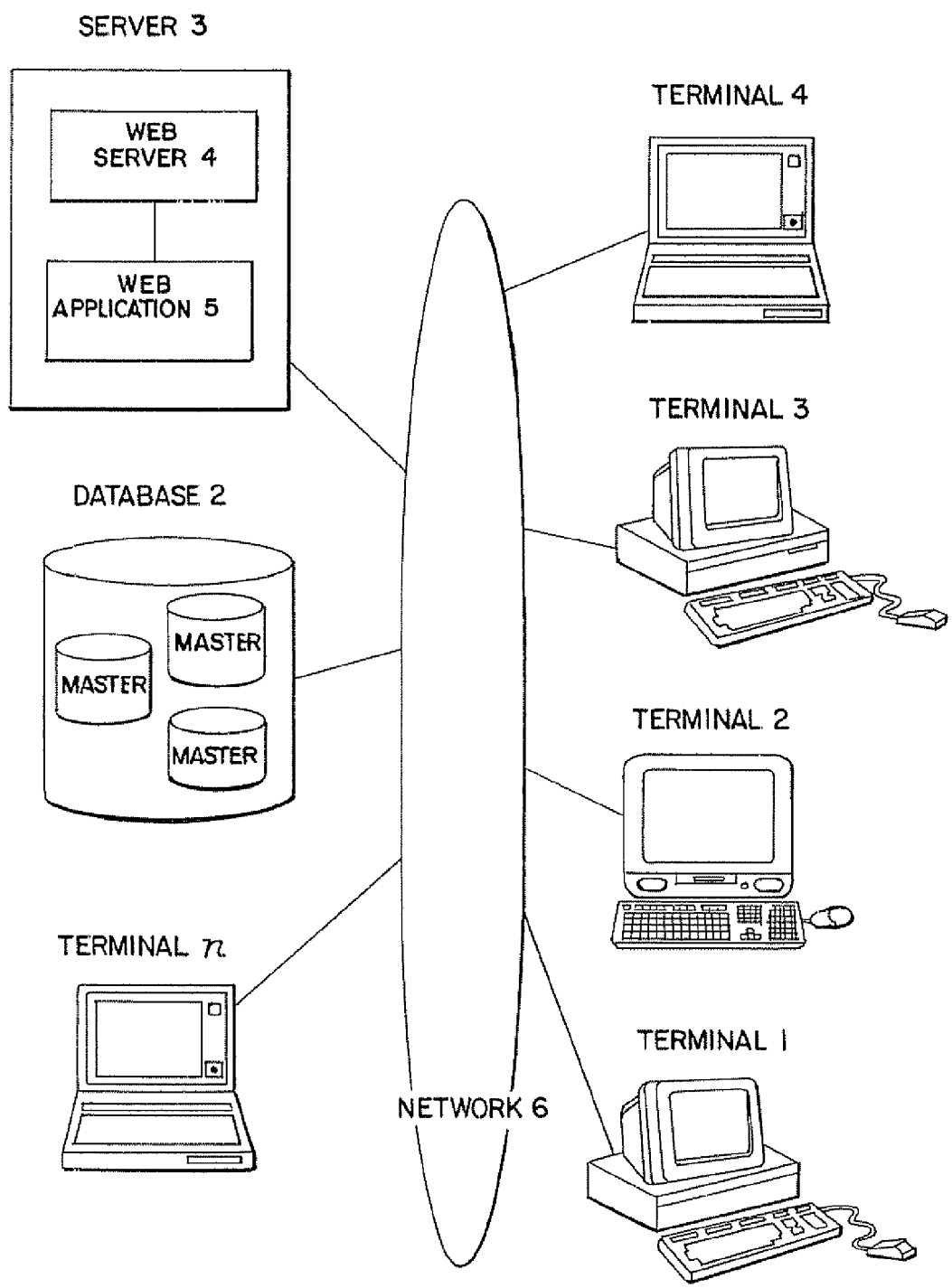
FIG. 1 shows the entire configuration of a work data management system according to the present invention.

This work data management system is provided with a terminal 1 etc. (a plurality of terminals are connected to a network 6) through which to input work data, a database 2, and a server 3, and is connected to the network 6. The server 3 is provided with a Web server 4 and a Web application 5. Each terminal is provided with a display section, an input section (a keyboard and a mouse), and a Web browser. Each employee inputs his work data through one of the terminals. Although in FIG. 1, the database 2 and the server 3 are separated from each other, the database 2 may be incorporated in the server 3. In the present invention, the database 2 is divided into an employee data master, a substitute attendance master, a unit/group master, a job master, a work data list master, a work data list-2 master, a work management section master, a paid holiday master, and a company holiday master. In the present invention, no problem occurs even if the number of terminals for data input is smaller than the number of employees.

In this embodiment, it is assumed that work data of an employee (not having approval authority) on Jan. 26, 2001 are "work form: regular work (e.g., 9:00 to 17:45); overtime work: 18:00 to 20:00; and rest: 17:45 to 18:00."

Figure 2:
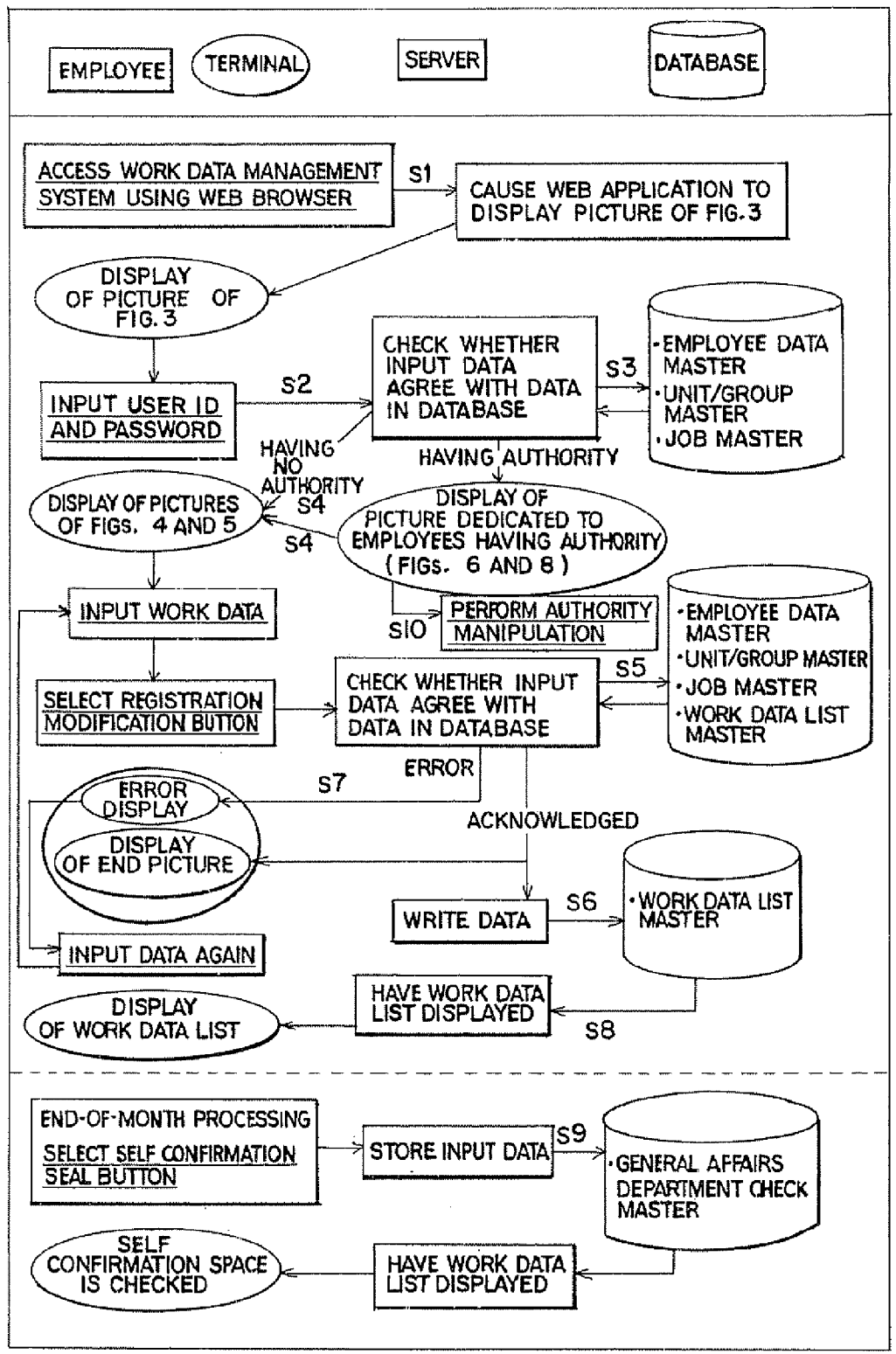
FIG. 2 is a flowchart showing how data are input in the work data management system according to the present invention.

The employee accesses the page of the work data management system by using the Web browser of a terminal that is connected to the network 6 (s1 in FIG. 2). The employee inputs a preset employee number (user ID) and password to a picture being displayed that is shown in FIG. 3 (s2 in FIG. 2). The Web application 5 checks whether the user ID and the password that have been input by the employee agree with corresponding data stored in the database 2 (the employee data master, unit/group master, and job master) (s3 in FIG. 2). If it is confirmed that the employee is the person registered and does not have any special authority such as approval authority the Web application 5 displays a picture to be used for inputting a month for which to input work data as shown in FIG. 4. If it is judged at step s3 that the employee has special authority, the Web application 5 displays a picture dedicated to employees having special authority.

Upon display of the picture of FIG. 4, the employee selects a month to input the work data. For instance, when a work data of Jan. 26, 2001 is to be input, the employee selects a button of January on this picture. And the employee presses the work data list display button ((1) in FIG. 4) in order to display the work data list as shown in FIG. 11. After that, the employee presses a date button ((1) in FIG. 11) to input the work data (in this embodiment, a $26^{th}$ day), and a work data input picture as shown in FIG. 5 is displayed (s4 in FIG. 2).

First, the employee selects a work form (in this embodiment, regular work), inputs work start time and work end time, and selects a rest time. Although in this embodiment the system is so configured that a rest time can be selected in steps of 15 minutes, a party who will practice the invention may set steps as appropriate. However, if "regular work" is selected as a work form, overtime work start time (in this embodiment, 18:00) is input automatically. Therefore, when "regular work" is selected, the employee inputs only input-necessary items, that is, inputs overtime work end time (in this embodiment, 20:00) and selects a rest time (in this embodiment, 00:15). And the employee selects a registration modification button (s5 in FIG. 2).

Work forms other than the regular work are shift work, substitute attendance, and holiday attendance. After selecting one of those, the employee inputs work start time and work end time and selects a rest time. Items (a work form etc.) that need to be input according to office regulations may be changed as appropriate. When a certain employee does overtime work for more than 8 hours and hence he needs to have a substitute holiday, the input-necessary items include not only a work start time, a work end time, and a rest time but also a scheduled substitute holiday.

When the employee has input work data and selects the registration modification button, the Web server 4 checks whether the input data agree with data of the employee such as a group to which he belongs, a job, etc. that are registered in the database 2 (s6 in FIG. 2). If the appropriateness of the work data have been confirmed and the work data have been acknowledged, the work data that have been input by the employee are stored in the work data list master.

If the data that have been input by the employee are judged not appropriate as exemplified by a case that the overtime working hours exceed the maximum time (e.g., 50 hours per month) prescribed by the regulations or that there remains an input-necessary item that has not been input, an error display is made (s7 in FIG. 2). When the error display is made, the employee inputs work data again.

If the appropriateness of the work data has been confirmed, a display announcing completion of data registration is made. If the employee selects an OK button, a list of work data is displayed (s8 in FIG. 2).

Next, a description will be made of how the manager of each unit (who has approval authority over the employees belonging to the unit; hereinafter referred to as a superior) approves work data that are input daily by each employee.

The superior accesses the work data management system from the Web browser of a terminal that is connected to the intra-company network. The superior inputs a preset employee number (user ID) and password to a picture being displayed that is shown in FIG. 3 (s2 in FIG. 2). The Web application 5 checks whether the input user ID and password agree with corresponding data stored in the database 2 (the employee data master, unit/group master, and job master) (s3 in FIG. 2). If it is confirmed that the superior has superior authority, a picture dedicated to superiors as shown in FIG. 6 is displayed (s10 in FIG. 2).

If the superior selects an approval manipulation picture button ((1) in FIG. 6) for stamping an approval seal by a superior is selected, a superior check processing picture is displayed as shown in FIG. 7A. The superior selects the name of an employee belonging to the unit and a work data list reference button. The superior checks daily work data that were input by the selected employee and are shown in a work data list picture. If the work data are approvable, the superior selects a work data approval button ((1) in FIG. 7B) and thereby has the work data of the employee stored. As a result, the work data of the employee are stored in the work data list master. The resulting state is a state that a superior approval seal has been stamped. The descriptions of the input of daily work data and the manipulations for exercising the approval authority end here.

Next, processing manipulations that are performed at the end of each month will be described.

At the end of a month, after confirming that input of all work data of the month has completed, an employee selects a self-confirmation seal button ((2) in FIG. 4) (an end-of-month processing manipulation). Upon the selection of the end-of-month processing manipulation button, a self-confirmation seal space is checked (s9 in FIG. 2). This establishes a state that even the employee himself can no longer modify the work data. The data so far generated are stored in the work management section master.

The system is so configured that whether data in which an employee confirmation seal is stamped as a result of an end-of-month processing manipulation have been stored in the work management section master is shown in the superior authority display picture of FIG. 7A. Looking at this picture, the superior checks whether an end-of-month processing manipulation has been performed. If no employee confirmation seal has been stamped yet, the superior urges the employee to perform an end-of-month processing manipulation. The superior selects an end-of-month approval authority processing button shown in FIG. 7A as a protection processing for disabling modification of input data from this time onward. (Protection processing for disabling data modification thereafter will be hereinafter called locking.) When the superior selects the end-of-month approval authority processing button, a superior approval seal space in a work data list display picture is checked (an end-of-month approval authority processing manipulation). The data so far generated are stored in the work management section master. The superior performs the above approval processing for each employee. If the superior finds an input error in work data of an employee and hence judges it unapprovable, he selects a locking cancellation button shown in FIG. 7A and thereby cancels the locking that was made by the employee, whereby the employee can input work data again. Re-input work data are stored in the work management section master.

Next, a description will be made of manipulations that are performed in a unit in charge of a check and management of work statuses of employees (hereinafter referred to as a general affairs department) for the purposes of a final check and data protection after completion of end-of-month processing manipulations by the respective superiors of respective units.

A person having a work management section authority accesses the page of the work data management system using the Web browser of a terminal that is connected to the intra-company network. The person inputs a preset employee number (user ID) and password to a picture being displayed that is shown in FIG. 3. If the Web application 5 judges, based on data stored in the database 2 (the employee master, unit/group master, and job master), that the person is an employee having work management section authority, a picture dedicated to the work management section authority is displayed as shown in FIG. 8 (s10 in FIG. 2).

The fact that the superiors of respective units have completed end-of-month processing manipulations and resulting data have been stored in the work management section master is displayed as a message on the general affairs department authority display picture. Upon display of this message, the person selects a work data list reference button.

In an input error of an employee or a superior is found in this state, the person cancels locking by selecting a locking cancellation button ((2) in FIG. 9; the locking cancellation is part of the work management section authority) and causes the employee or the superior to input data or perform an approval manipulation again.

If it is confirmed that work data of all employees for which end-of-month processing manipulations and superiors' end-of-month approval authority processing manipulations have completed are correctly input data, a general affairs department approval button ((1) in FIG. 9) is selected (a work management section end-of-month approval authority processing manipulation). As a result, a work management section approval seal space is checked and the data so far generated are stored in the work management section master.

After completion of the above operations, the person selects a final locking button ((3) in FIG. 9) and effects locking to protect the data finally (a final protection processing manipulation) and has the final data stored in the work management section master. From this time onward, no input or modification can be made to the work time data and they can only be referred to.

If a superior selects a work data input picture button in the picture of FIG. 6, he can input work data of himself. If an employee having work management section authority selects a work data input picture button in a picture shown in FIG. 8, he can input work data of himself. The work data input method of an employee having work management section authority is the same as the above-described input method.

As described above, in the work data management system according to the invention, the Web application 5 of the server 3 is executed, whereby the appropriateness of input data is checked by using data stored in the database 2. Input data are stored in the database 2 and managed in a unified manner. Therefore, using any terminal that is connected to the network 6 and has a Web browser, anyone can input, check, approve, and refer to work data. An appropriateness check as to whether an employee who intends to input data is the registered person is performed by using a user ID and a password that were set for him in advance. Therefore, different employees can perform manipulations for inputting or approving work data from the same terminal irrespective of whether they have special authority.

Most of data are input by a selection method, and input data are not judged appropriate and are not acknowledged unless all input items have been input. Therefore, the probability of erroneous input or failure of input of an input item by an employee can be minimized.

Embodiment 2

In this embodiment, input methods of daily work data with various work forms will be described.

First, a description will be made of a case that an employee has made substitute attendance. In this embodiment, it is assumed that when an employee worked for 8 hours or more (in terms of the actual labor (work) time) on a day that is a holiday according to the company holiday data, it is judged that he made substitute attendance.

Figure 10:
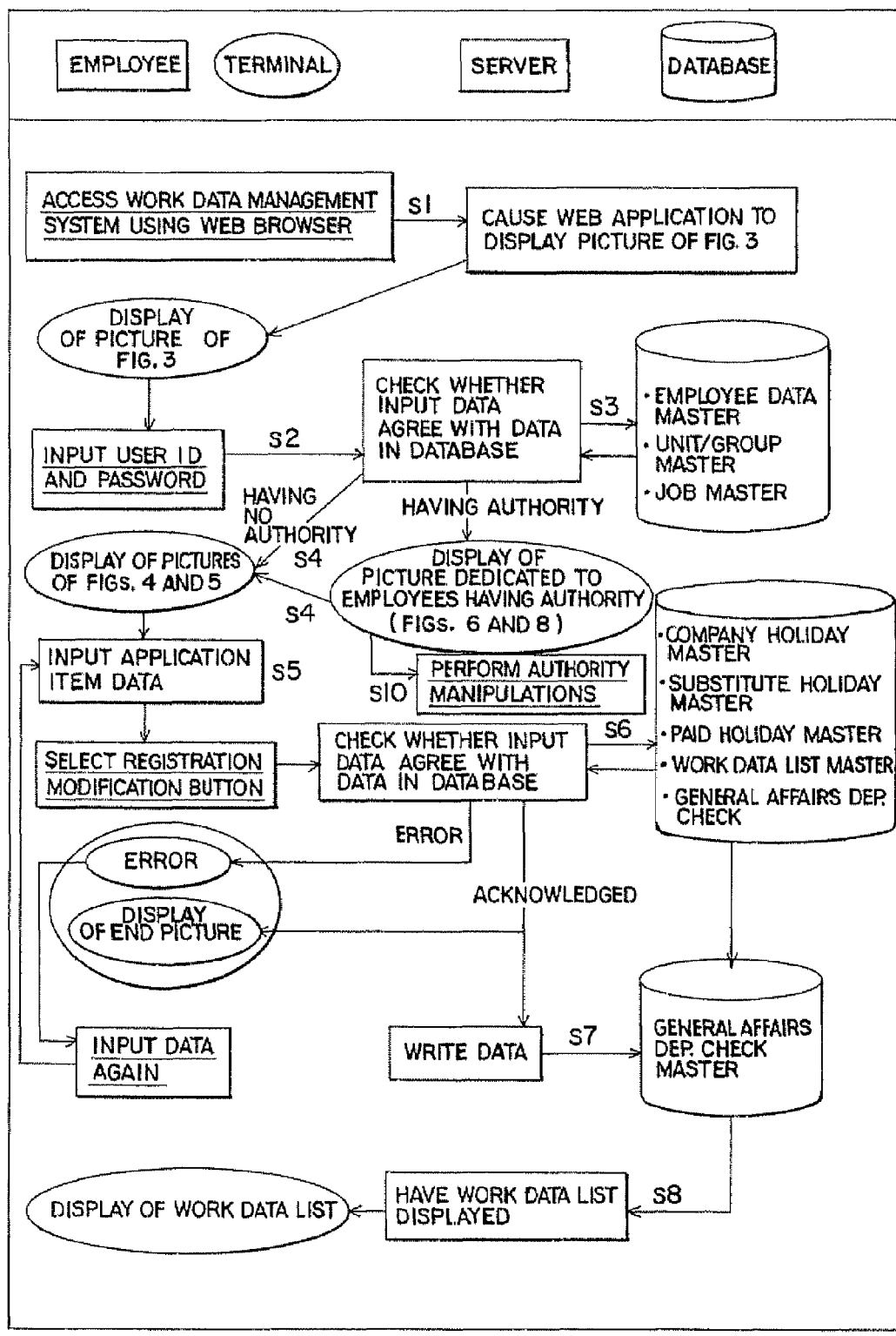
FIG. 10 is a flowchart showing how data are input in the work data management system according to the present invention.

An employee access the work management system from a terminal (s1 in FIG. 10), inputs a user ID and a password (s2 in FIG. 10), and the appropriateness of the input data is checked by using the database 2 (s3 in FIG. 10). If it is judged that the employee does not have special authority, a displayed work data input picture is opened as shown in FIG. 5 (s4 in FIG. 10). The employee selects substitute attendance as an attendance form.

The employee inputs work start time, work end time, and a rest time in the same manner as in the first embodiment, and then inputs a scheduled substitute holiday (s5 in FIG. 10). If for some reason the employee will make substitute attendance after acquiring a substitute holiday first, he may input a scheduled substitute work day.

After performing the above input manipulations, the employee selects the registration modification button, whereupon the appropriateness of the input data is checked by using the database 2 (the employee data master, substitute attendance master, company holiday master, and work data list master) (s6 in FIG. 10). If judged appropriate, the data are stored in the work data list master. If judged inappropriate, error display is made.

If the employee could not be absent from the company on the scheduled (i.e., input at the time of application) substitute holiday or could not work on the scheduled substitute work day and the substitute holiday or work day was carried forward to the next month, the employee inputs a new scheduled day in the application picture (FIG. 5) and thereby has the substitute holiday or work day data in the database 2 rewritten. From this time onward, the appropriateness of an input substitute holiday or work day is checked by using the scheduled day thus rewritten.

Next, a description will be made of an input method that is employed when an employee did shift work.

An employee selects shift work in the work data input picture shown in FIG. 5 and inputs work start time, work end time, and a rest time (midnight rest time). After inputting the necessary items, the employee selects the registration modification button, whereupon their appropriateness is checked by using the database 2 (the employee data master, unit/group master, job master, and work data list master). If judged appropriate, the data are stored in the work data list master. If judged inappropriate (e.g., the input working hours are shorter than the time prescribed by the office regulations), error display is made. In this case, the employee inputs data until they are acknowledged.

In the case of the shift work, both of work start time and work end time are input. Therefore, this input method is available even if flextime is introduced.

Next, a description will be made of an input method that is employed when an employee made holiday attendance.

An employee selects holiday attendance in the work data input picture. It is assumed that an employee worked for less than 8 hours (in terms of the actual labor (work) time) on a day that is a holiday according to the company holiday data, it is judged that he made holiday attendance. The employee inputs work start time and work end time and selects a rest time. After inputting the necessary items, the employee selects the registration modification button, whereupon the Web application 5 judges whether the input data agree with corresponding data stored in the database 2 (the employee data master, company holiday master, and work data list master). If judged appropriate, the data are stored in the work data list master. If judged inappropriate, error display is made. In this case, the employee inputs data until they are acknowledged.

The above office regulations may be determined as appropriate by a party who will practice the invention. For example, the manner of checking whether input data agree with corresponding data in the database 2 can be changed according to the office regulations.

The superior's approval authority processing manipulations that are performed after input of work data of any of the above various work forms are the same as described in the first embodiment and hence will not be described.

As is apparent from this embodiment, the work data management system according to the invention can deal with various work forms.

Embodiment 3

An input method for application items (such as an application for a paid holiday) other than work data will be described in this embodiment.

An employee accesses the page of the work data management system by using the Web browser of a terminal that is connected to the intra-company network (s1 in FIG. 10). The employee inputs a preset employee number (user ID) and password to the picture being displayed that is shown in FIG. 3 (s2 in FIG. 10). The Web application 5 checks whether the user ID and the password that have been input by the employee agree with corresponding data stored in the database 2 (the employee data master, unit/group master, and job master) (s3 in FIG. 10). If it is confirmed that the employee is the person registered and does not have any special authority, the Web application 5 displays the picture to be used for inputting a month for which to input work data as shown in FIG. 4. If it is judged at step s3 that the employee has special authority, the Web application 5 displays a picture dedicated to employees having special authority.

Then, the employee selects a month and a day for which he intends to input an application item and has the application item input picture displaced as shown in FIG. 5. If the application item is late coming, mid-duty absence, or early leaving, the employee selects the application item and inputs start time, end time and a reason for the application. When having selected a special holiday, the employee selects a reason for it.

After performing the above input manipulations, the employee selects the registration modification button to have the data stored. The Web application 5 judges whether the input data agree with corresponding data stored in the database 2 (the company holiday master, paid holiday master, substitute attendance master, and work data list master). If judged inappropriate, error display is made. In this case, the employee inputs data again. If judged appropriate, the application item data are stored in the work data list-2 master. The work data list-2 master is used for storing data of application items that are input daily by employees only at low probabilities.

When the employee has completed the input of the application item, the superior checks and approves the application item. That is, if the application item is approvable, the superior selects an application item approval button ((2) in FIG. 7B).

When the application item has been approved and an approval seal has been stamped for it, a message indicating the approval of the application item is displayed to the employee himself. The approval-seal-manipulated data are stored in the work data list-2 master.

The fact that the application item has been approved is shown as a message in the picture (see FIG. 3) that is displayed after the employee input his user ID and password.

If the superior judges that the application item is not approvable, he selects an application item disapproval button ((4) in FIG. 7B) and thereby discards the application item data of the employee.

Also for application items, in performing general affairs department end-of-month approval authority processing manipulations, the general affairs department checks whether superiors' approval authority processing manipulations and employees' end-of-month processing manipulations have completed. After checking completion of the above kinds of manipulations, the general affairs department performs general affairs department approval authority processing manipulations and thereby has the data stored in the general affairs department check master. Then, for final protection of the application item data, the general affairs department selects the locking button for final protection and thereby has the data stored in the general affairs department check master.

Embodiment 4

A case that the terminals through which employees input data are connected to a network other than an intra-company network LAN will be described in this embodiment.

The work data management system according to the invention uses the Web server 4 and the Web application 5, and also uses the terminals having a Web browser as terminals through which to input data. Therefore, not only employees who can use the terminals that are connected to the intra-company LAN but also employees who are working in very distant branch offices, for example, can input work data over a WAN (e.g., the Internet). Superiors and employees having general department authority can perform approval manipulations and protection manipulations on work data of the employees working in the very distant branch offices.

By starting the Web browser in a terminal that is connected to the network and access a preset address of the work data management system, each of employees working in factories, for example, that are distributed in the whole country can access the work data management system that is managed in the head office and thereby input or refer to work data.

When the work data management system is updated, no updating work is needed with each terminal as long as updating work is done with the server 3. Wherever a terminal exists, an employee can perform input, referencing, or authority manipulations with the work data management system as long as the terminal is connected to a WAN.

Embodiment 5

An input method that is employed when it is necessary to modify or change registration data of an employee will be described in this embodiment.

When it has become necessary to modify registration data of an employee because of personnel changes or to generate registration data of a new employee, registration data are modified or generated by the general affairs department authority. Although in the embodiments only the general affairs department has authority to modify registration data, a party who will practice the invention may make a different setting.

Any employee having general affairs department authority can access the work data management system from any terminal connected to the network 6 and perform manipulations for modifying data in the database 2.

In the work data management system according to the present invention, all data are stored in the database 2 that is connected to the network 6. When an employee forgets his password, he can set a new password in the password input picture even if he does not have special authority.

According to the present invention, since the number of work data to be input by an employee himself is small, the probability of erroneous input of work data is low and work data can be managed correctly.

Since the work data management system according to the present invention operates on the Web server, it is not necessary to move data to each terminal. When the work data management system is updated, no updating work is needed with each terminal as long as updating work is done with the server. Any personal computer having a Web browser can be used as a terminal, and an employee can input or refer to work data from any terminal irrespective of his manipulable processing contents. If an employee has special authority, he can perform approval manipulations or protection manipulations.

The network for connecting the terminals, the database, and the server to each other is not limited to an intra-company LAN and may be the Internet or a WAN. Therefore, for example, even if a company has sales offices etc. at various places in the whole country and terminals through which employees input work data are distributed in the whole country, each employee can access a preset address of the work data management system from a terminal over the Internet. The general affairs department in the head office can manage (i.e., approve, check, protect, etc.) work data or application item data of the employees at the various places in a unified manner.

What is claimed is:

1. A work data management method comprising:
   inputting a user ID and a password through a terminal connected to a network;
   identifying an employee based on data stored in a database using the user ID and the password, and checking manipulable processing contents of the employee;
   displaying, on the terminal, a picture to input a work data;
   receiving work data;
   checking appropriateness of said input work data, and storing the input work data in a work data list master if the input work data is judged appropriate, if the input work is judged inappropriate, displaying an error message and again receiving work data;
   receiving an approval authority for said work data;
   storing, in a work data list master, the work data for which an approval authority processing manipulation has been completed, and which includes said approval authority with the work data;

receiving an end-of-month confirmation of said work data and storing, in a work management section master, data for which an end-of-month processing manipulation based on said confirmation has been completed, wherein the employee can no longer modify the data, and providing to a superior whether end-of-month confirmation has occurred;

receiving an end-of-month approval authority for said data for which an end-of-month processing manipulation has been completed and storing, in the work management section master, data for which an end-of-month approval authority processing manipulation has been completed, and which includes said end-of-month approval authority with the data;

receiving a general affairs department end-of-month approval authority for said data for which an end-of-month authority processing manipulation has been completed and storing, in the work management section master, data for which a general affairs department end-of-month approval authority processing manipulation has been completed, and which includes said general affairs department end-of-month approval authority with the data; and receiving a final locking of said data and storing, in the work management section master, data for which a final protection processing manipulation has been completed.

2. The work data management method according to claim 1, further comprising a step of displaying a picture dedicated to approval authority on the terminal if at the identifying step the employee is judged eligible to perform an approval authority manipulation as well as to input work data.

3. The work data management method according to claim 1, further comprising a step of displaying a picture dedicated to general affairs department authority on the terminal if at the identifying step the employee is judged eligible to perform an approval authority manipulation and a final protection manipulation.

4. The work data management method according to claim 1, wherein the work data is input through a personal computer having a Web browser.

5. The work data management method according to claim 1, wherein the network is at least one of a local area network and a wide area network.

6. A work data management method comprising:
inputting a user ID and a password through a terminal connected to a network;
identifying an employee based on data stored in a database using the user ID and the password, and checking manipulable processing contents of the employee;
displaying, on the terminal, a picture to input a work data;
checking appropriateness of an input work data, and storing the input work data in a work data list master if the input work data is judged appropriate;
storing, in a work management section master, data for which an end-of-month processing manipulation has completed;
storing, in the work management section master, data for which an end-of-month approval authority processing manipulation has completed;
storing, in the work management section master, data for which a general affairs department end-of-month approval authority processing manipulation has completed; and
storing, in the work management section master, data for which a final protection processing manipulation has completed.

7. The work data management method according to claim 6, further comprising a step of displaying a picture dedicated to approval authority on the terminal if at the identifying step the employee is judged eligible to perform an approval authority manipulation as well as to input work data.

8. The work data management method according to claim 6, further comprising a step of displaying a picture dedicated to general affairs department authority on the terminal if at the identifying step the employee is judged eligible to perform an approval authority manipulation and a final protection manipulation.

9. The work data management method according to claim 6, wherein the work data is input through a personal computer having a Web browser.

10. The work data management method according to claim 6, wherein the network is at least one of a local area network and a wide area network.

11. A work data management method comprising:
inputting a user ID and a password through a terminal connected to a network;
identifying an employee based on data stored in a database using the user ID and the password, and checking manipulable processing contents of the employee;
displaying, on the terminal, a picture to input a work data;
checking appropriateness of an input work data, and storing the input work data in a work data list master if the input work data is judged appropriate;
storing, in a work management section master, data for which an end-of-month processing manipulation has completed;
storing, in the work management section master, data for which a general affairs department end-of-month approval authority processing manipulation has completed; and
storing, in the work management section master, data for which a final protection processing manipulation has completed.

12. The work data management method according to claim 11, further comprising a step of displaying a picture dedicated to approval authority on the terminal if at the identifying step the employee is judged eligible to perform an approval authority manipulation as well as to input work data.

13. The work data management method according to claim 11, further comprising a step of displaying a picture dedicated to general affairs department authority on the terminal if at the identifying step the employee is judged eligible to perform an approval authority manipulation and a final protection manipulation.

14. The work data management method according to claim 11, wherein the work data is input through a personal computer having a Web browser.

15. The work data management method according to claim 11, wherein the network is at least one of a local area network and a wide area network.

16. A work data management method comprising:
inputting a user ID and a password through a terminal connected to a network;
identifying an employee based on data stored in a database using the user ID and the password, and checking manipulable processing contents of the employee;
displaying, on the terminal, a picture to input a work data;
checking appropriateness of an input work data, and storing the input work data in a work data list master if the input work data is judged appropriate;
storing, in a work management section master, data for which an end-of-month processing manipulation has completed;

storing, in the work management section master, data for which an end-of-month approval authority processing manipulation has completed; and storing, in the work management section master, data for which a final protection processing manipulation has completed.

17. The work data management method according to claim 16, further comprising a step of displaying a picture dedicated to approval authority on the terminal if at the identifying step the employee is judged eligible to perform an approval authority manipulation as well as to input work data.

18. The work data management method according to claim 16, further comprising a step of displaying a picture dedicated to general affairs department authority on the terminal if at the identifying step the employee is judged eligible to perform an approval authority manipulation and a final protection manipulation.

19. The work data management method according to claim 16, wherein the work data is input through a personal computer having a Web browser.

20. The work data management method according to claim 16, wherein the network is at least one of a local area network and a wide area network.

* * * * *